United States Patent [19]

Ruhnau et al.

[11] 4,050,747
[45] Sept. 27, 1977

[54] DIGITAL WHEEL SPEED CIRCUIT ARRANGED TO COMPENSATE FOR DIMENSIONAL IRREGULARITIES OF SENSOR ROTOR MEMBER

[75] Inventors: Gerhard Ruhnau; Wolfgang Gudat, both of Hannover; Peter Liermann; Karl-Heinz Hesse, both of Gehrden, all of Germany

[73] Assignee: WABCO Westinghouse GmbH, Hannover, Germany

[21] Appl. No.: 757,830

[22] Filed: Jan. 10, 1977

[30] Foreign Application Priority Data

Apr. 17, 1976 Germany .............................. 2616972

[51] Int. Cl.² ................................................ B60T 8/02
[52] U.S. Cl. ........................................ 303/95; 364/424; 307/233 R; 324/78 D; 324/166; 361/240; 364/565
[58] Field of Search ............................ 303/96, 99, 95; 235/151.32, 150.2; 361/236, 240; 324/160, 166, 78 D; 307/233 R

[56] References Cited

U.S. PATENT DOCUMENTS

| 3,757,167 | 9/1973 | Yoshikawa ............................ 324/160 |
| 3,937,525 | 2/1976 | Luhdorff ............................ 235/150.2 |

*Primary Examiner*—Trygve M. Blix
*Assistant Examiner*—Reinhard J. Eisenzopf
*Attorney, Agent, or Firm*—R. W. McIntire, Jr.

[57] ABSTRACT

A wheel speed measuring apparatus is provided for use in an anti-skid brake control system such that a digital speed signal is obtained having good accuracy without resorting to expensive manufacturing methods to assure exact conformity of the teeth and teeth spaces of the rotor member of the wheel sensor device used in the anti-skid control system. The speed measuring apparatus consists of at least two corresponding portions, each consisting of a control unit, a counter and a data register. The control unit of one portion responds to a positive polarity transition of the square wave signal generated by the wheel sensor, while the control unit of the other portion responds to negative polarity transitions, to initiate operation of the respective counters. The count output of each counter therefore provides a digital speed signal corresponding to a full cycle duration of the square wave signal, with one cycle overlapping the other to compensate for any deviations in the half-cycle durations due to size differences in the teeth and spaces of the rotor member of the sensor that generates the square wave signal.

7 Claims, 5 Drawing Figures

DIGITAL WHEEL SPEED CIRCUIT ARRANGED TO COMPENSATE FOR DIMENSIONAL IRREGULARITIES OF SENSOR ROTOR MEMBER

BACKGROUND OF THE INVENTION

The present invention relates to apparatus for measuring vehicle wheel speeds in accordance with digital values measured within the time duration of the cycles of an alternating voltage generated by means of a toothed rotor which may be of the type typically known as a magnetic pick-up.

Such wheel speed measuring apparatus is used in conjunction with anti-skid brake control systems for preventing the occurrence of an inadmissible slip of the vehicle wheel, which is the incipient condition of wheel skids.

Because of difficulties experienced during manufacture of the toothed rotor member, close dimensional tolerances between a tooth and tooth space cannot be achieved economically. In actual service, these dimensional variances result in signal distortion to the extent that different measured values of the half-cycle durations comprising the generated sinusoidal voltage waveform developed. In that these digital measures of the successive half-cycle durations of the generated sinusoidal voltage are used to detect wheel speed, any difference in the measured values will indicate a change of wheel speed, which is in turn used to detect wheel slips. It is imperative, therefore, that in order to prevent false wheel slip signals from occurring, signal distortions resulting from the dimensional tolerances of the toothed rotor member must be eliminated.

This can be accomplished by sensing only successive full cycles, or by sensing only the positive or the negative half cycles of the generated sinusoidal voltage. In the former instance, the error due to the measured difference between successive half cycles is averaged out over the full cycle, while in the latter case the half cycle measures are taken only from the teeth or from the tooth spaces in order to avoid measuring any dimensional differences between a tooth and tooth space. By avoiding signal distortions in this manner, however, it becomes apparent that only a single unit of information is utilized by measuring either the single full cycle or a single half cycle of the sinusoidal voltage, whereas each half cycle of the sinusoidal voltage makes possible the use of two information units per cycle. This lack of full utilization of available information units results in inefficient wheel skid control, particularly at low vehicle speeds.

In copending U.S. patent application, Ser. No. 733,424 (Case 6849), filed Oct. 18, 1976, there is disclosed an electronic circuit arrangement in which the measured time values of successive half cycles of a sinusoidal voltage generated by the alternate passing of a tooth and tooth space of a rotor in proximity of a magnetic pick-up device are compared and any error difference is corrected in order to obtain accurate wheel speed signals, without loss of efficiency. However, as the need for frequency multiplication of the sinusoidal voltage is increased to optimize the wheel skid control, the cost of the electronic equipment required to correct the similarly increased frequency of the signal distortions becomes excessive.

SUMMARY OF THE INVENTION

The object of the present invention, therefore, as it relates to a system for generating digital measured values of the cycle durations of a sinusoidal voltage whose frequency is proportional to the wheel speed of a vehicle, is to avoid signal distortions resulting from variations in the successive half cycle durations of the sinusoidal voltage without loss of information units and without incurring excessive costs where multiplication of the signal frequency is desired.

In achieving the above objective, the duration between two consecutive positive and two consecutive negative going polarities of successive square wave cycles of the sinusoidal signal voltage is measured so that each measured value corresponds to a full cycle and thus eliminates any deviation in the measured value of two half cycles of the signal voltage. By overlapping the full cycle values by a half cycle interval, both the positive and negative half cycles of the square wave signal are utilized as information units for maximum signal resolution. Each measured value corresponds to the average speed during a full cycle and thus avoids the signal distortion resulting from successive half cycles of different duration when dimensional differences exist between a tooth and successive tooth space, without sacrificing resolution.

Briefly, there is provided a pulse generator whose constant frequency impulses are counted by a first counter that is periodically reset by a control unit comprising a second counter. The control unit is enabled in response to a positive going edge of the square wave signal produced by a wave-shaping circuit that converts the sinusoidal wheel sensor voltage into a corresponding square wave. Also connected to the second counter of the control unit are the impulses from the pulse generator. When the control unit is enabled, the first impulse causes the second counter to provide an output which effects the transfer of the count accumulated by the first counter to a data register for storage; the second impulse provides an output to reset the first counter; and the third impulse resets the second counter to disable the control unit until the next positive going edge of the square wave signal is received. Consequently, the control unit is reset at the beginning of each cycle and in turn resets the first counter once each cycle so as to obtain a count corresponding to the duration of a full cycle.

An identical arrangement of a control unit and counter is provided for measuring the duration of a cycle of the sinusoidal wheel sensor voltage beginning with the negative going edge of the square wave signal produced by the wave shaping circuit. In that the positive and negative edges of the square wave occur alternately at half cycle intervals, it will be apparent that the counters provide a measure of a full cycle duration at half cycle intervals and that each successive full cycle overlaps the preceding full cycle by a half cycle duration.

In order to obtain greater resolution and thus improved accuracy, the square wave shaping circuit may be arranged to produce square wave signals at a frequency that is $2^n$ times greater than the fundamental sinusoidal wheel sensor signal voltage. To accommodate this frequency multiplication, $2^n$ number of control units and counters are provided corresponding to the number of positive going edges of the square wave signal falling into the fundamental oscillation and $2^n$ number of control units and counters corresponding to the number of negative going edges of the square wave signal. This results in a speed signal occurring at ¼ cycle intervals where the fundamental frequency is doubled, at ⅛ cycle intervals where the fundamental frequency is quadrupled, etc. Accordingly, the respective units of information and thus the degree of resolution are correspondingly increased.

BRIEF DESCRIPTION OF THE DRAWINGS

In the drawings to which the following more detailed explanation refers.

DESCRIPTION AND OPERATION

Figure 1:
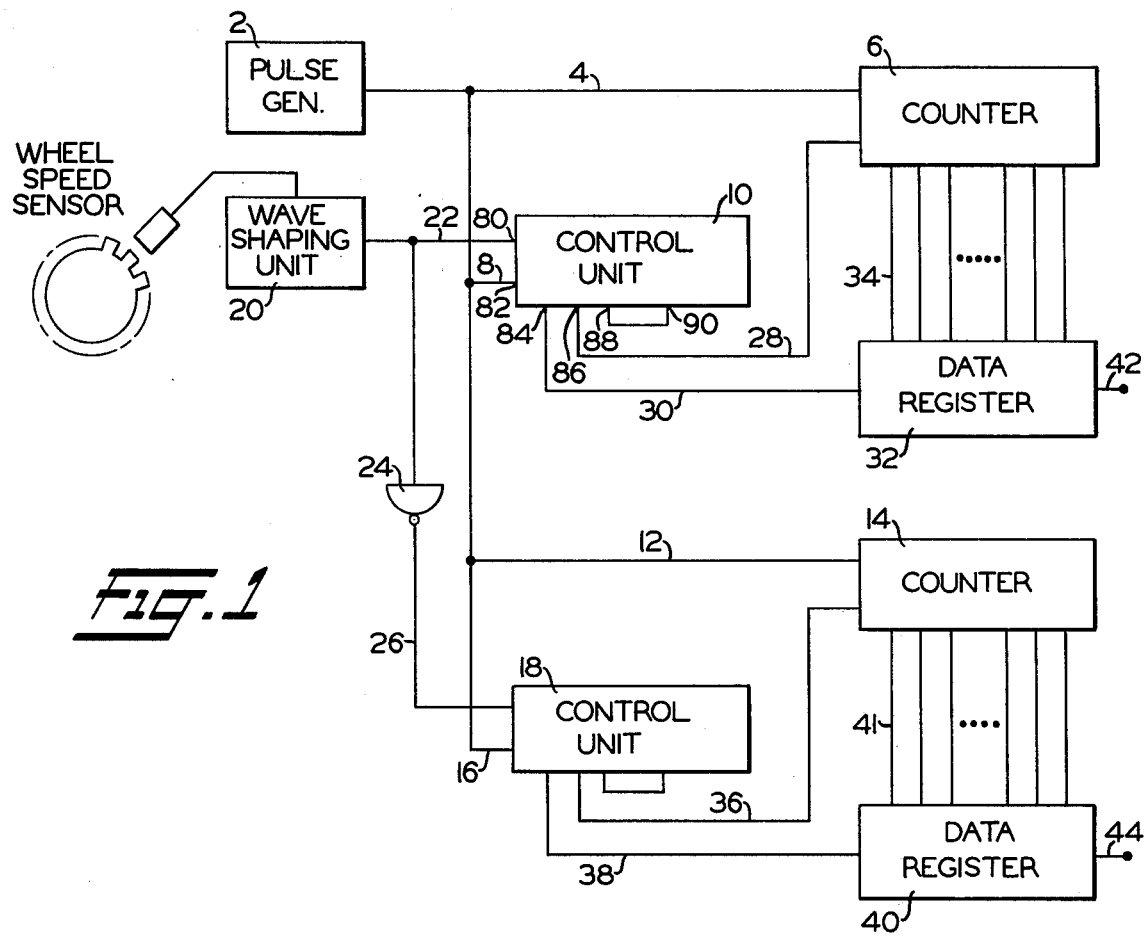
FIG. 1 is a block diagram according to a preferred embodiment of the invention.

Referring to FIG. 1, there is shown a conventional type pulse generator device 2 that emits impulses at a predetermined constant frequency to a counter 6 via a line 4, to a control unit 10 via a line 8, to a counter 14 via a line 12, and to a control unit 18 via a line 16.

A wheel sensor of conventional design associated with a toothed rotor of the wheel of a vehicle generates a sinusoidal voltage having a frequency that varies with the wheel velocity. A shaping circuit 20 converts the sinusoidal voltage into a voltage having a square shaped waveform whose frequency is proportional to the sensor generated sinusoidal voltage. Shaping circuit 20 is connected to control unit 10 via line 22 and to control unit 18 via a signal inverter 24 and a line 26. Control units 10 and 18 each consist of a conventional type counter having a reset input 80 to which line 22 is connected, a count input 82 to which line 8 is connected, a clock-enable input 90 and outputs 84, 86 and 88. A transfer control line 30 connects output 84 to a data register 32, a reset line 28 connects output 86 to counter 6 and output 88 is connected to the clock-enable input 90. The corresponding outputs of counter 18 are similarly connected by control line 38 to a data register 40, by a reset line 36 to counter 14 and to the clock-enable input.

Data registers 32 and 40 have an output line 42 and 44, respectively, via which the count taken from the counters 6 and 14 can be recalled.

Figure 1A:
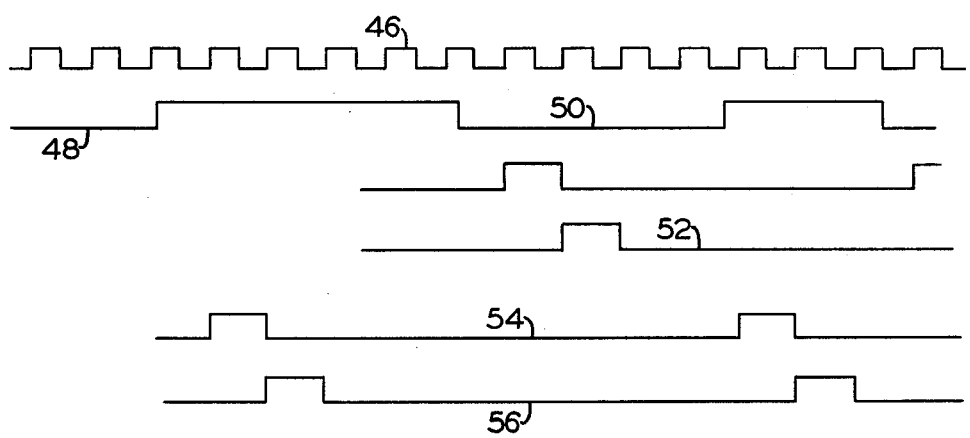
FIG. 1a is a diagram of the waveforms provided by the devices of the embodiment of FIG. 1.

In FIG. 1a, waveform 46 represents the constant frequency impulses emitted by pulse generator 2, waveform 48 represents the square shaped signal voltage emitted by circuit 20, waveform 50 represents the transfer control signal supplied via counter output 84 and waveform 52 represents the reset signal supplied via counter output 86. Waveforms 54 and 56 represent waveforms associated with the counter of control unit 18 that are similar to waveforms 50 and 52 associated with the counter of control unit 10.

The counting pulses are continually supplied by pulse generator 2 to counters 6 and 14 and to the counters comprising control units 10 and 18. The counters comprising control units 10 and 18 are reset when a "high" signal appears via line 22 and remain reset until the "high" signal goes to a "low" potential. When set by a "low" signal, the counters of control units 10 and 18 are conditioned to receive the pulse generator impulses at counting input 82. The first impulse after the counter of control unit 10 is set produces a signal at output 84 until a second impulse is received. This first control signal causes data register 32 to transfer into storage the count provided by counter 6 at the time.

The second impulse resets the stage of the counter providing the control signal at output 84, while concurrently setting the stage of the counter associated with output 86 to provide a reset signal to counter 6. Counter 6 is thus reset and begins a new count when its reset signal disappears upon appearance of a third impulse at counting input 82.

This third impulse is used to concurrently disable the counter of control unit 10 via the clock-enable input 90, thereby preventing further signals from occurring at outputs 84, 86 and 88 during the remainder of time the "low" potential signal is present at line 22.

When the "low" signal at line 22 undergoes a positive transition to a "high" potential, the counter of control unit 10 is reset and remains reset, as previously mentioned, until the "high" potential signal subsequently undergoes a negative transition to a "low" potential. Following this second transition of the square wave signal at line 22 to a "low" potential, the count accumulated by counter 6 is again transferred to data register 32 and counter 6 is again reset begin a new count, as previously explained. It will thus be apparent that the count accumulated by counter 6 occurs for a duration corresponding to a complete cycle of the square wave signal provided by circuit 20.

Control unit 18 operates in the same manner as control unit 10 to transfer the count of counter 14 to data register 40 and to reset the counter to begin a new count periodically, except that an inverter changes the polarity of the square wave signal at line 22 so that the count registered by counter 14 corresponds to a full cycle duration defined by the positive going transitions of the square wave rather than the negative transitions. In this manner, a count is transferred to data register 40 according to the duration of the previous cycle, so that a full cycle count is provided by each of the respective counters 6 and 14 at half cycle intervals.

Figure 2:
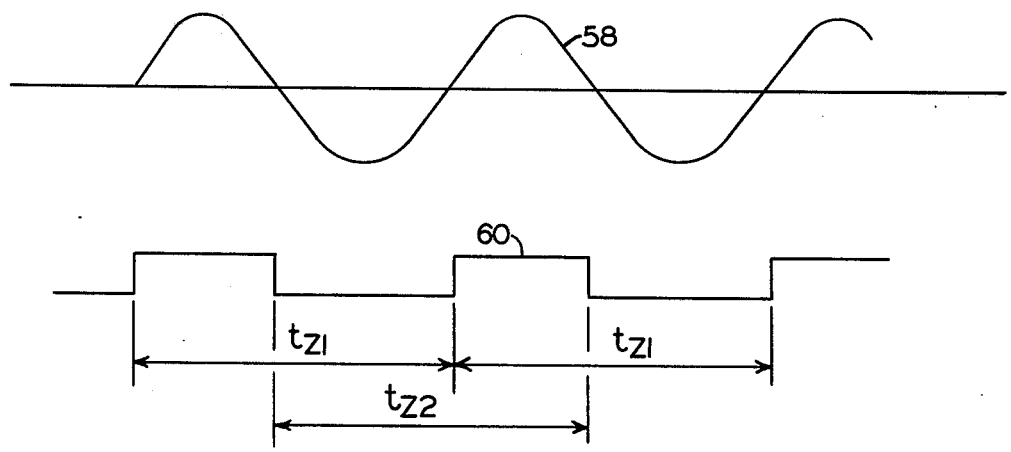
FIG. 2 is a waveform diagram illustrating utilization of a fundamental frequency.

In FIG. 2, waveform 58 represents the wheel sensor generated sinusoidal signal voltage, while waveform 60 represents the square wave signal obtained from the sinusoidal signal via wave shaping circuit 20. The frequency of waveform 60 is the same as the fundamental frequency of the sinusoidal wheel sensor voltage. Associated with waveform 60 are the time periods $t_{z1}$ during which counter 6 is counting and the time periods $t_{z2}$ representing the duration counter 14 is counting, it being noted that the respective counting periods each cover a full cycle duration but are initiated at half cycle intervals.

Figure 3:
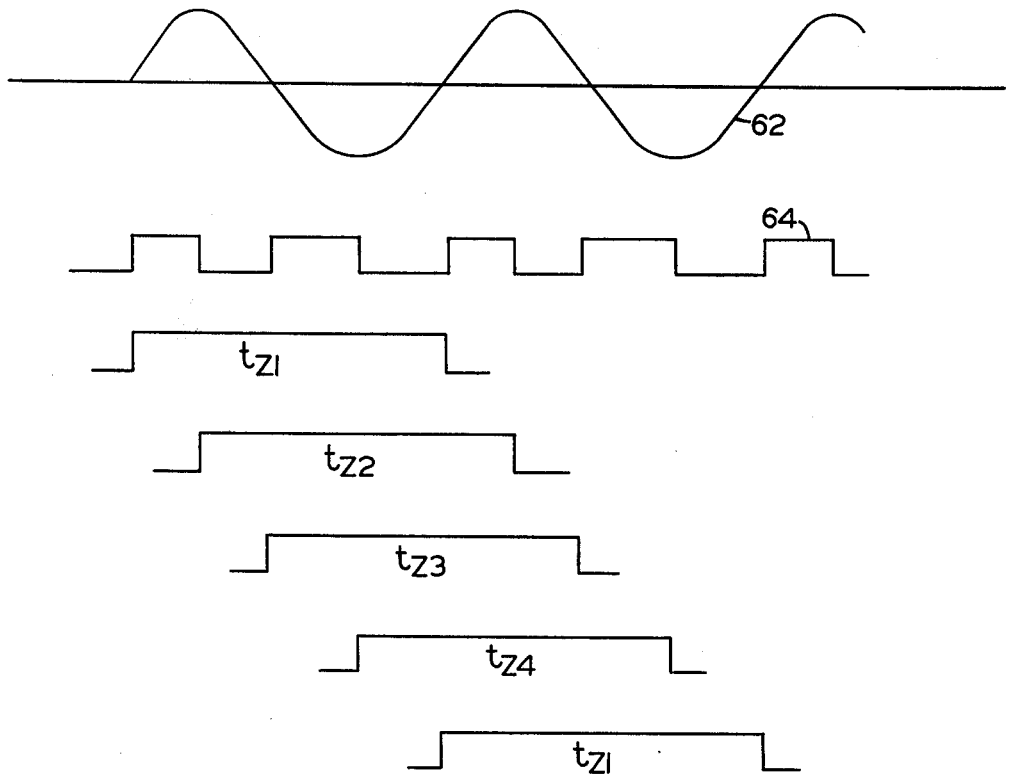
FIG. 3 is a waveform diagram illustrating the increased resolution obtained by utilizing a frequency double that of the fundamental.

In FIG. 3, waveform 62 represents the wheel sensor generated sinusoidal signal voltage, while waveform 64 is the corresponding square wave signal from circuit 20, which in this case is provided at twice the frequency of the fundamental frequency. By utilizing a frequency that is a multiple of the fundamental frequency, improved resolution of the digital count of wheel speed is obtained. This doubled frequency of the fundamental wheel velocity voltage may be connected to each of a pair of flip-flops via which the respective circuitry of FIG. 1 and a duplicate circuit may be controlled. One flip-flop produces an output responsive to positive going excursions and the other flip-flop responds to negative going excursions of waveform 64, so that the flip-flop outputs are phase displaced 90° relative to each other, and each flip-flop output frequency corresponds to the fundamental. While the circuit of FIG. 1 is producing a signal count for the periods $t_{z1}$ and $t_{z3}$, the duplicate circuit will be producing a signal count for the period $t_{z2}$ and $t_{z4}$. Thus, a full cycle count is provided at $\frac{1}{4}$ cycle intervals. Resolution can be even further improved by quadrupling the fundamental frequency, in which case an arrangement consisting of four of the FIG. 1 circuits would be employed, including eight counters. In general then, a frequency of $2^n$ times the fundamental would require $2^{n+1}$ counters, where $n > 0$.

Figure 4:
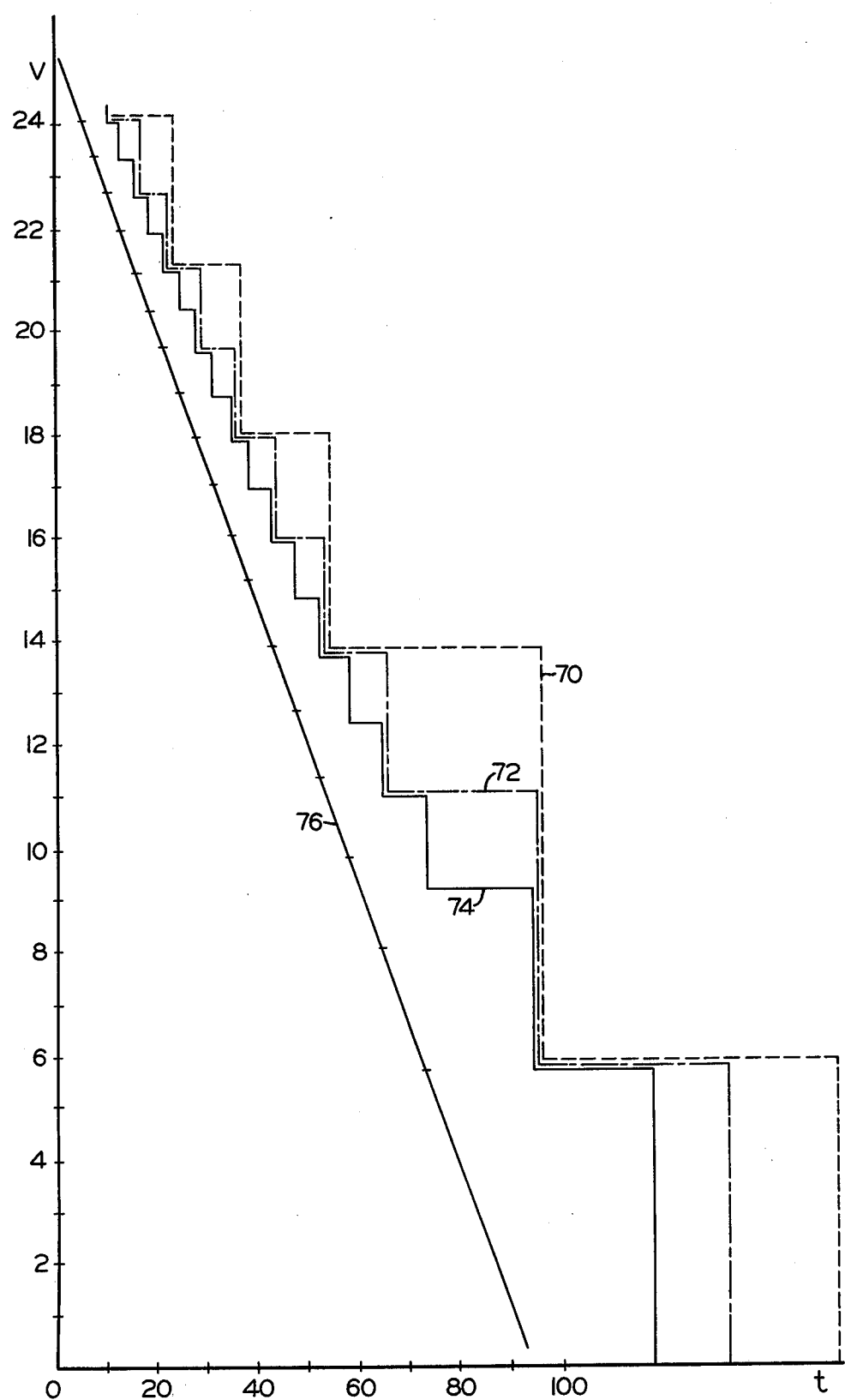
FIG. 4 is a graph showing wheel speed signals obtained from the digital measurement of a cycle duration for various square wave signal frequency multiples of the fundamental frequency during uniform braking of a vehicle.

In FIG. 4 is shown a graph representing wheel speed signals for various frequencies of the fundamental assuming a uniformly decelerating wheel. The dashed staircase curve occurs if only a single counter is used so that the speed measurement arrives at an interval of one cycle. Staircase curve 72, indicated by a dot-dash line, occurs when two counters are used, as illustrated in FIG. 2, so that the speed measurement arrives at an interval of one-half cycle. The solid line staircase curve 74 occurs when four counters are used, as represented by the graph of FIG. 3 in which the speed measurement occurs at one-quarter cycle intervals. From a comparison of these curves 70, 72 and 74, it will be seen that the approximation to the actual speed curve 76 steadily improves as the frequency increases.

Having now described the invention, what we claim as new and desire to secure by Letters Patent, is:

1. A circuit for providing a digital speed signal according to the angular velocity of a vehicle wheel comprising:
   a. a wheel speed sensor device including a toothed rotor rotatable with the wheel, said sensor device generating a sinusoidal voltage having a fundamental frequency proportional to the rotational speed of the toothed rotor;
   b. means for converting said sinusoidal voltage into a square wave signal; and
   c. means for measuring the time duration between two positive polarity transitions of said square wave signal occurring at full cycle intervals and between two negative polarity transitions of said square wave signal occurring at full cycle intervals to provide said digital speed signal for each said full cycle interval thereof, said full cycle intervals defined by said positive and said negative polarity transitions having an overlapping relationship therebetween.

2. The circuit, as recited in claim 1, further characterized in that said square wave signal has a frequency corresponding to the fundamental frequency of said sinusoidal voltage, whereby said full cycle intervals between said positive and negative polarity transitions are measured between two consecutive positive polarity transitions and two consecutive negative polarity transitions to cause the respective full cycle intervals providing said digital speed signal to overlap by one-half cycle.

3. The circuit, as recited in claim 1, wherein said measuring means comprises:
   a. a pulse generator for producing a clock signal consisting of a train of impulses at a constant frequency;
   b. first and second counters to which said clock signal is connected for counting the impulses thereof;
   c. first control means operative responsive to said positive polarity transitions of said square wave signal for periodically resetting said first counter whereby a measure of said full cycle interval between said positive polarity transitions is obtained; and
   d. second control means operative responsive to said negative polarity transitions of said square wave signal for periodically resetting said second counter whereby a measure of said full cycle interval between said negative transitions is obtained.

4. The circuit, as recited in claim 3, wherein:
   a. said means for converting the sinusoidal signal into a square wave signal provides said square wave signal at a frequency of $2^n$ times said fundamental frequency; and
   b. said measuring means correspond in number to $2^n$ times said fundamental frequency, said first and second counters of each said measuring means being operative to provide said digital speed signal at $\frac{1}{2}^{n+1}$ cycle intervals.

5. The circuit, as recited in claim 3, further comprising a signal inverter via which said square wave signal is connected to said second control means.

6. The circuit, as recited in claim 5, wherein said measuring means further comprises means for registering the count of said first and second counters in accordance with said first and second control means being operative responsive to said positive and said negative polarity transitions, respectively, of said square wave signal prior to said first and said second counters being reset.

7. The circuit, as recited in claim 6, wherein said first and second control means each comprise a counter having a first input subject to said clock signal, a second input subject to said square wave signal, the positive and negative polarity transitions of which operatively set and reset said counter of said first and second control means, a first count output providing a transfer signal to effect operation of said register means, and a second count output providing a reset signal to reset a respective one of said first and second counters.

* * * * *